US006390126B1

United States Patent
Kimura

(10) Patent No.: US 6,390,126 B1
(45) Date of Patent: May 21, 2002

(54) COUPLING DEVICE TO PREVENT FLUID LEAKAGE

(75) Inventor: Seiji Kimura, Itami (JP)

(73) Assignee: Pascal Kabushiki Kaisha (JP)

( * ) Notice: Subject to any disclaimer, the term of this patent is extended or adjusted under 35 U.S.C. 154(b) by 0 days.

(21) Appl. No.: 09/586,703

(22) Filed: Jun. 5, 2000

(30) Foreign Application Priority Data

Jun. 3, 1999 (JP) ............................................. 11-156416

(51) Int. Cl.[7] .............................................. F16L 37/28
(52) U.S. Cl. ............................ 137/614.04; 137/614.03; 137/614.05
(58) Field of Search ....................... 137/614.03, 614.05, 137/614.04

(56) References Cited

U.S. PATENT DOCUMENTS 4,429,713 A * 2/1984 Walter ................... 137/614.03
4,917,149 A * 4/1990 Grantham ............... 137/614.03
5,123,448 A * 6/1992 Kjellberg et al. ....... 137/614.03
5,462,084 A * 10/1995 Arisato ................... 137/614.03
5,494,073 A * 2/1996 Saito ...................... 137/164.03

* cited by examiner

Primary Examiner—Kevin Lee
(74) Attorney, Agent, or Firm—Morrison Law Firm

(57) ABSTRACT

A coupling device, having a simple structure, prevents leakage of fluid from an auxiliary valve in a female coupler. The coupling device seals fluid containing air in the female coupler, even in the pressure of the fluid remains or is as low as the ambient pressure level when the male coupler is separated from the female coupler. An annular seal, having integrally formed first and second annular seal elements, is provided in the female coupler. The first annular seal seals between a protruded cylindrical member of the male coupler and a mating cylindrical member of the female coupler. The second annular seal forms a valve body portion of the cylindrical member of the female coupler.

7 Claims, 8 Drawing Sheets

COUPLING DEVICE TO PREVENT FLUID LEAKAGE

BACKGROUND OF THE INVENTION

The present invention relates to a coupling device having a male coupler and a female coupler. More particularly, the present invention relates to an improved coupling device having a valve at the outlet of a female coupler adapted for having a certain shut-down property to prevent a fluid from leaking out from the female coupler.

A variety of conventional coupling devices, each comprising a male coupler and a female coupler, have been introduced for practical use in industrial machines to detachably connect one fluid path to the other in a fluid supply system (e.g. of hydraulic or pneumatic system). For example, a work pallet for detachably holding one or more works to be machined by a machining center includes one or more hydraulic clamping apparatuses. A coupling device is commonly provided for connecting a hydraulic path to the hydraulic clamping apparatus for supplying a hydraulic pressure.

Referring to FIGS. 8 to 10, a conventional coupling device 100, developed by the same applicants as of the present invention, includes a male coupler 101, a female coupler 102, and a hydraulic cylinder 103.

While male coupler 101 is fixed with a plurality of bolts 104, female coupler 102 is located lower than male coupler 101 and joined to hydraulic cylinder 103 for moving forward and backward. Female coupler 102 is installed in a cylinder body 105 of hydraulic cylinder 103 and is driven by hydraulic cylinder 103, moving between a coupled position and a separated position.

Male coupler 101 has a protruded cylindrical portion provided at the lower end thereof which can be inserted into the upper end of female coupler 102. When the male and female couplers 101 and 102 are coupled to each other (see FIG. 10), both a main opening/closing valve 106 and an auxiliary opening/closing valve 107 in male coupler 101 open their hydraulic passages. When the male and female couplers 101 and 102 are separated from each other (see FIGS. 8 and 9), both main valve 106 and auxiliary valve 107 in male coupler 101 shut down their hydraulic passages.

As a valve shaft 109 of auxiliary valve 107 in the coupled position retracts in an upward direction relative to the protruded cylindrical portion, its valve body portion 110 comes into direct contact, with metal touch, with the annular tapered face of a valve seat portion 108 of auxiliary opening/closing valve 107. Therefore, auxiliary valve 107 is constituted as a seat type valve.

When the male and female couplers 101 and 102 are in the coupled position (see FIG. 10), both a main opening/closing valve 111 and an auxiliary opening/closing valve 112 in the female coupler 102 open their hydraulic passages. In the separated position (see FIGS. 8 and 9), both main valve 111 and auxiliary valve 112 shut down their hydraulic passages. As shown in FIG. 9, while main valve 111 shuts down its hydraulic passage in the separated position, the passage between a cylindrical member 113 and a shaft member 114 of auxiliary valve 112 is closed. Because shaft member 114 moves into the protruded cylindrical portion of male coupler 101 in the coupled position as shown in FIG. 10, it is difficult to constitute auxiliary opening/closing valve 112 as a seat type valve. Accordingly, auxiliary valve 112 permits its shaft member 114 to fit at its distal end into a valve face opening of cylindrical member 113 for closing the passage. The distal end of cylindrical member 113 is thus equipped with an annular seal element 115 made of a synthetic resin material to seal off the lower end of the protruded cylindrical portion of male coupler 101 in the coupled position.

When connected to a hydraulic source provided with a oil pressurizing means, such as an electric pressure pump, the system is supplied with a hydraulic oil which may contain some air. As a result, when the male and female couplers 101 and 102 are separated from each other, minute bubbles of air may be trapped in female coupler 102 and then leak out with oil from auxiliary valve 112, resulting in a loss of the hydraulic oil and polluting the environment of the coupling device.

For example, by providing a separable structure of shaft member 114 of female coupler 102, it is possible to constitute the auxiliary opening/closing valve 112 as a seat type valve like that of male coupler 101. However, the internal pressure in female coupler 102 is decreased close to an ambient pressure in the separated position, hardly pressing against the seat portion. Accordingly, the leakage of air and oil from auxiliary opening/closing valve 112 is unavoidable. In addition, because the oil of higher pressure which leaked from main opening/closing valve 111 may act on the distal end of female coupler 102 and exert a large force against shaft member 114, it is an adverse idea to decrease the diameter of shaft member 114.

OBJECT AND SUMMARY OF THE INVENTION

It is an object of the present invention to provide a coupling device which overcomes the foregoing problems.

More specifically, it is an object of the present invention to provide a coupling device which can prevent any leakage of a fluid from an auxiliary opening/closing valve in its female coupler with a simple arrangement.

It is a further object of the present invention to provide a coupling device which seals the fluid containing air in the female coupler, even if the pressure of the fluid remains or is as low as the ambient pressure level when its two couplers are separated from each other.

The coupling device according to the present invention has a male coupler and a female coupler capable of detachably coupling with the male coupler to connect and disconnect the passage of a pressurized fluid.

Briefly stated, the present invention provides a coupling device, having a simple structure, which prevents leakage of fluid from an auxiliary valve in a female coupler. The coupling device seals fluid containing air in the female coupler, even in the pressure of the fluid remains or is as low as the ambient pressure level when the male coupler is separated from the female coupler. An annular seal, having integrally formed first and second annular seal elements, is provided in the female coupler. The first annular seal seals between a protruded cylindrical member of the male coupler and a mating cylindrical member of the female coupler. The second annular seal forms a valve body portion of the cylindrical member of the female coupler.

According to one embodiment of the present invention, there is provided a coupling device having a male coupler and a female coupler, wherein said male coupler and said female coupler fit together to connect a passage of a fluid, wherein: the male coupler includes a first valve mechanism having a protruded cylindrical member; a valve shaft axially movable in an interior of the protruded cylindrical member; a first valve body portion on the valve shaft; the valve body portion engaging and disengaging from the interior with a valve seat portion provided in the protruded cylindrical member, thereby shutting down the passage of the fluid between the protruded cylindrical member and the valve shaft; and a first spring, urging the first valve shaft toward a closed position; the female coupler includes a second valve mechanism having a main body case with an engaging bore provided therein; the engaging bore fitting with the protruded cylindrical member; a shaft member mounted in the main body case; a cylindrical member, fitted on the shaft member, axially movable and positioned opposite to a distal end of the protruding cylindrical member; a second valve body portion provided on the cylindrical member, engaging and disengaging from an inner side with a cylindrical valve face portion; the cylindrical valve face portion provided near a distal end on the shaft member, thereby shutting down the passage of the fluid between the cylindrical member and the shaft member; and a second spring, urging the cylindrical member toward a valve closed position.

According to another embodiment of the present invention, there is provided a coupling device for coupling a male coupler and a female coupler, including a male coupler main valve; a male coupler auxiliary valve a female coupler main valve; a female coupler auxiliary valve; at least one male coupler spring, urging the male coupler main valve and the male coupler auxiliary valve in a closed position; at least one female coupler spring, urging the female coupler main valve and the female coupler auxiliary valve in a closed position; the male coupler auxiliary valve being positioned at least a portion of a protruded cylindrical member; the female coupler auxiliary valve being position in at least a portion of a cylindrical member; and the protruded cylindrical member fitting into the cylindrical member when the male coupler and the female coupler are mated.

In particular, the male coupler has a first valve mechanism, including an protruded cylindrical member provided for partially inserting into the female coupler. A valve shaft is installed for axial movements in the inner side of the protruded cylindrical member. A valve body portion is provided on the valve shaft for engaging and disengaging from the inner side with a valve seat portion provided in the protruded cylindrical member to shut down the passage of a fluid between the protruded cylindrical member and the valve shaft. A spring is also provided for urging the valve shaft towards a valve closed position.

The female coupler has a second valve mechanism including a main body case having an engaging bore provided therein into which the protruded cylindrical member can be advanced. A shaft member is mounted in the main body case. A cylindrical member is fitted on the shaft member for axially sliding movements and positioned opposite to the distal end of the protruded cylindrical member. A valve body portion is provided on the cylindrical member for engaging and disengaging from the inner side with a cylindrical valve face portion provided near the distal end on the shaft member to shut down the passage of a fluid between the cylindrical member and the shaft member. A spring is also provided for urging the cylindrical member towards a valve closed position. Additionally, an annular seal element is provided on the distal end of the cylindrical member, having a first annular seal portion for sealing between the protruded cylindrical member and the cylindrical member in the coupled position, and a second annular seal portion, forming the valve body portion of the cylindrical member. First and second annular seal portions are formed integrally.

When the male coupler and the female coupler are separated from each other, the first valve mechanism in the male coupler allows the valve body portion of the valve shaft to be pressed by the spring directly on the valve seat portion of the protruded cylindrical member to shut down the fluid passage between the protruded cylindrical member and the valve shaft. The second valve mechanism in the female coupler causes the cylindrical member to be urged towards the valve closed position by the spring so that the valve body portion of the cylindrical member comes into direct contact with the cylindrical valve face portion close to the distal end of the shaft member, hence closing the fluid passage between the cylindrical member and the shaft member. The annular seal element mounted on the distal end of the cylindrical member has the annular seal portion which incorporates the valve body portion of the cylindrical member, thus increasing the shut-down effect of the second valve mechanism in the female coupler and preventing any leakage of the fluid from the second valve mechanism when the two couplers are separated.

When the male coupler and the female coupler are moved close to each other in the coupled position, the protruded cylindrical member and the cylindrical member come into direct contact with each other and the valve shaft and the shaft member come into direct contact with each other. With the valve shaft and the shaft member remaining in direct contact with each other, the protruded cylindrical member moves partially into the engaging bore in the main case of the female coupler until the annular seal portion of the annular seal element, mounted on the cylindrical member, seals between the protruded cylindrical member and the cylindrical member. The first valve mechanism in the male coupler allows the valve body portion of the valve shaft to depart from the valve seat portion of the protruded cylindrical member as resisting against the yielding force of the spring, thus opening the fluid passage between the protruded cylindrical member and the valve shaft. The second valve mechanism in the female coupler permits the cylindrical member to be pressed down by the distal end of the protruded cylindrical member and retract inwardly as resisting against the yielding force of the spring, hence opening the fluid passage between the cylindrical member and the shaft member.

According to an embodiment of the present invention, the annular seal element consisting mainly of the annular seal portion, sealing between the protruded cylindrical member and the cylindrical member in the coupled position, and another annular seal portion, incorporating the valve body portion of the cylindrical member, is provided on the distal end of the cylindrical member. The sealing effect of the second valve mechanism in the female coupler is ensured in the separated position, even when the pressure of the fluid remains or is as low as the ambient pressure level in the female coupler. Any leakage of the fluid containing air from the second valve mechanism is prevented. As a result, the loss of the fluid, such as a working oil, is avoided, the environment of the coupling device is minimally polluted, and the operational durability of the coupling device is significantly increased. As the two annular seal portions are provided on the single annular seal element, the arrangement of the distal end of the cylindrical member is simplified, thus contributing to the decrease of the overall number of the components.

The annular seal element is preferably made of an elastic rubber material. In this case, the annular seal portion (the valve body portion of the cylindrical member) of the annular seal element is elastically deformed upon coming into direct contact with the cylindrical valve face portion of the shaft member. Any leakage of the fluid or air from the second valve mechanism in the female coupler is positively prevented, even if the pressure in the female coupler is close to the ambient pressure level. Also, the valve seat portion in the first valve mechanism is preferably an annular taper face so that the valve body portion of the valve shaft comes into direct contact with the valve seat portion at metal touch. This allows the valve shaft to be urged towards the valve closed side by the yielding force of the spring when the two couplers are separated and its valve body portion comes into direct contact with the annular taper face. This structure prevents any leakage of the fluid from the first valve mechanism in the male coupler.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
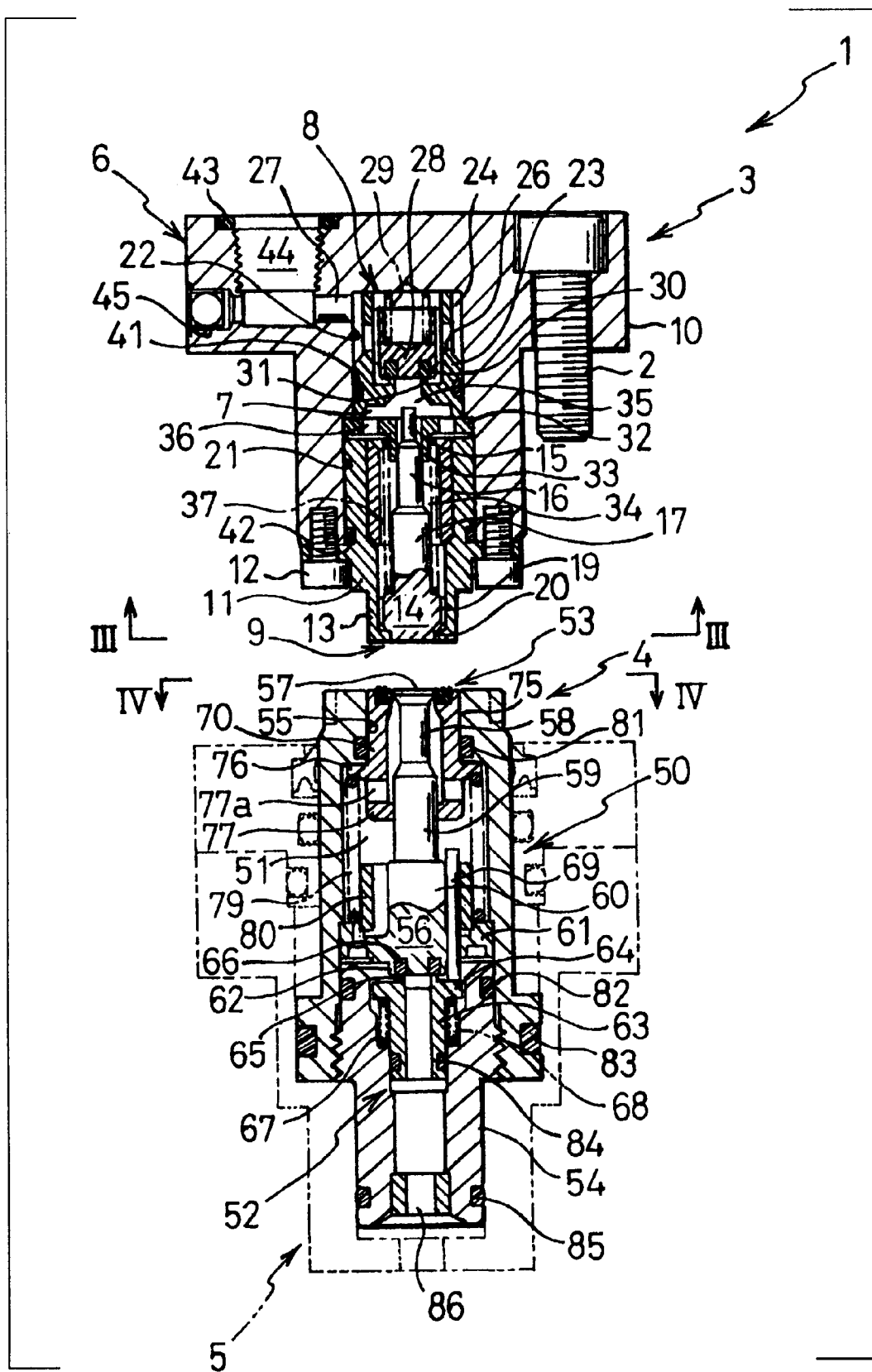
FIG. 1 is a vertical cross sectional view of a separated coupling device according to one embodiment of the present invention.
Figure 2:
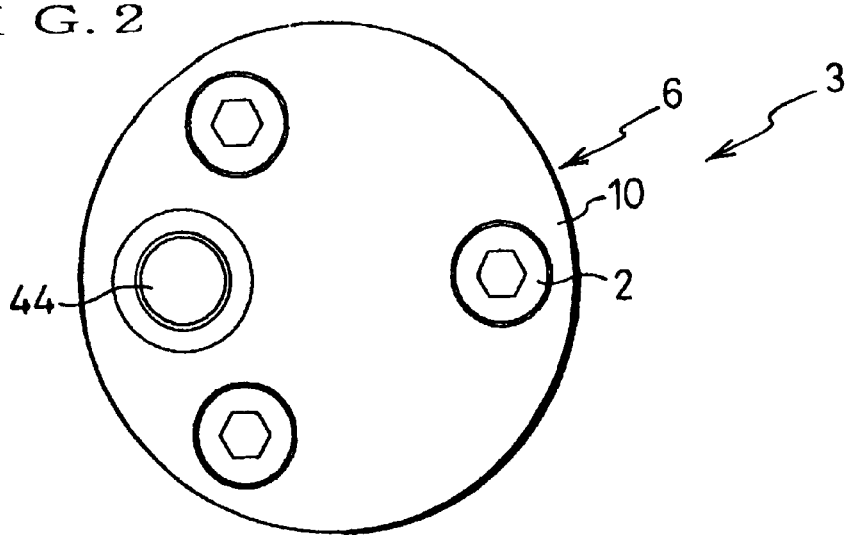
FIG. 2 is a plan view of a male coupler according to the present invention.
Figure 3:
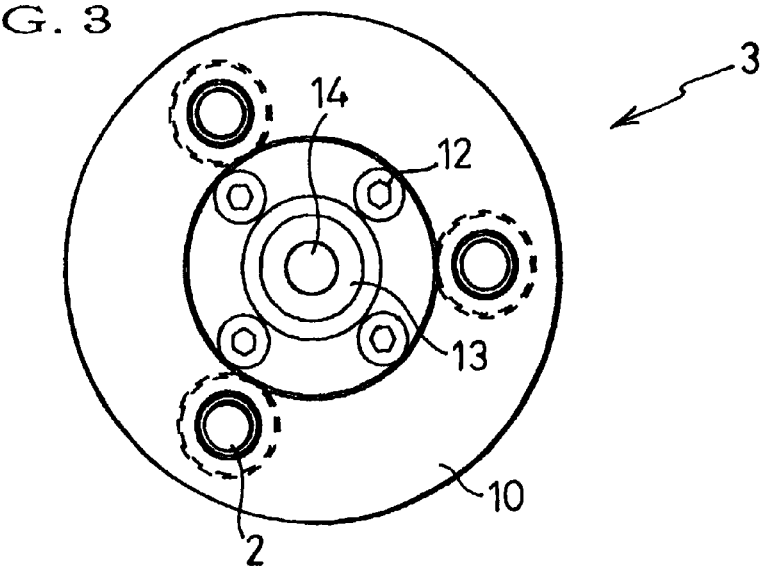
FIG. 3 is a cross sectional end view taken along the line III—III of FIG. 1.

A preferred embodiment of the present invention will be described referring to the relevant drawings.

This embodiment is illustrated in the form a coupling device adapted for detachably connecting a hydraulic passage for supplying and discharging of hydraulic oil to and from one or more hydraulic clamping apparatuses mounted to a work pallet on which a plurality of works to be machined are detachably arranged in a machining center.

Referring to FIGS. 1 to 4, a coupling device 1 comprises a male coupler 3 fixedly mounted by three bolts 2 on a work pallet at an upper side. A female coupler 4 is provided at the opposite lower side to male coupler 3 and mounted to the base of a machining center. A hydraulic cylinder 5, moving female coupler 4 to and from male coupler 3, couples and separates coupling device 1.

First, the description will be made for male coupler 3.

Male coupler 3 includes a main case 6 with a hydraulic passage 7 within main case 6. A main opening/closing valve 8 opens and closes passage 7. An auxiliary opening/closing valve 9 opens and closes passage 7. Main case 6 is positioned vertically, having at the upper end, a flange 10 thereof fixedly joined by three bolts 2 to the work pallet (not shown).

A cylindrical case 11, constituting a portion of main case 6, is fitted into and tightened by four bolts 12 to the lower end of main case 6.

Figure 5:
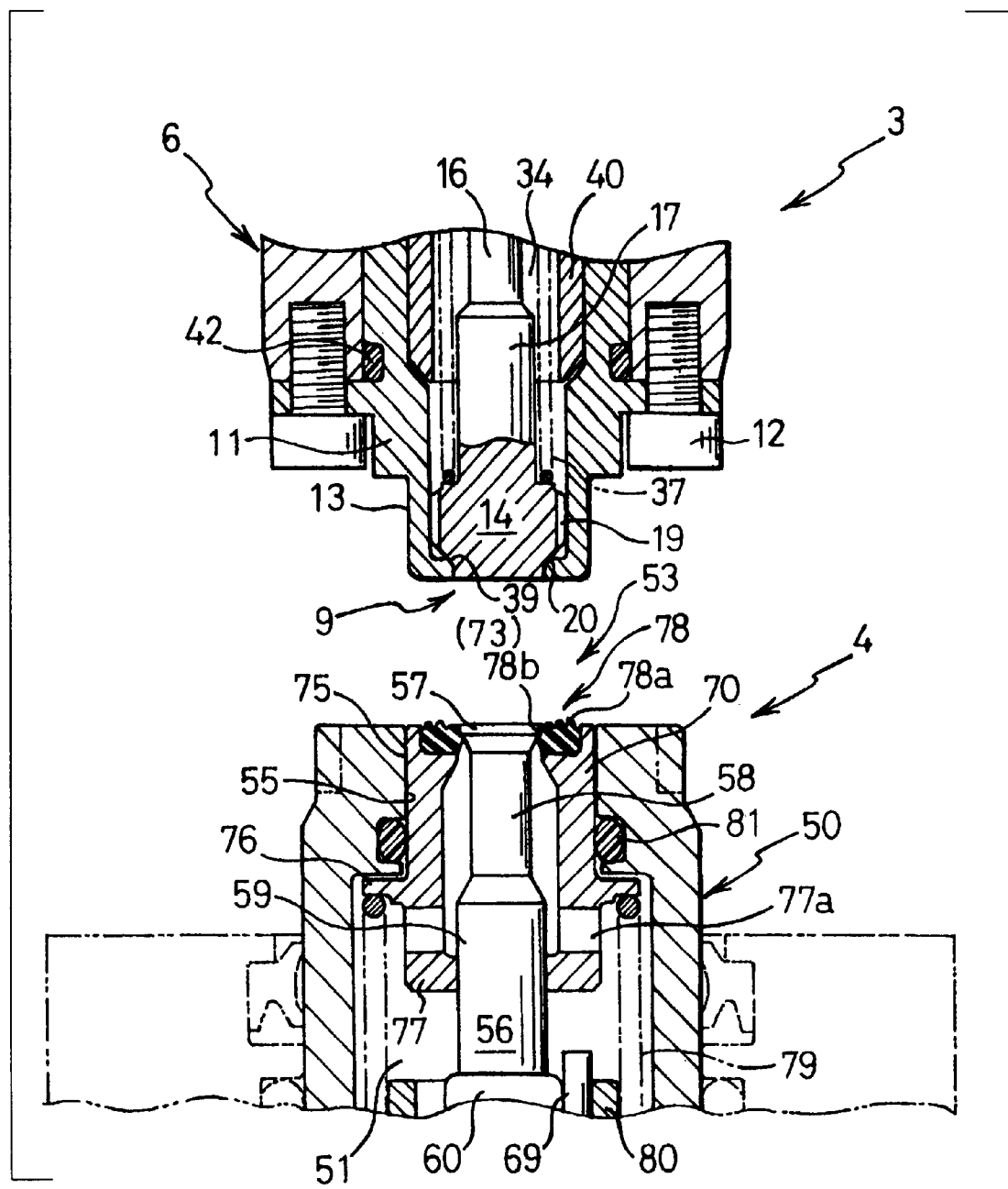
FIG. 5 is an enlarged cross sectional view of a primary part of the two separated couplers.

Referring to FIGS. 1 and 5, cylindrical case 11 has a downwardly protruded cylindrical portion 13 at a lower end thereof. Protruded cylindrical portion 13 is arranged so that it is inserted partially into female coupler 4. A valve shaft 14 is installed inside of protruded cylindrical portion 13 for axial movements. Valve shaft 14 includes, from the upper end to the lower end, a small-diameter portion 15, a medium diameter portion 16, a large-diameter portion 17, a sliding guide face 19, and a valve body portion 20.

The main opening/closing valve 8 in male coupler 3 is now explained.

Figure 6:
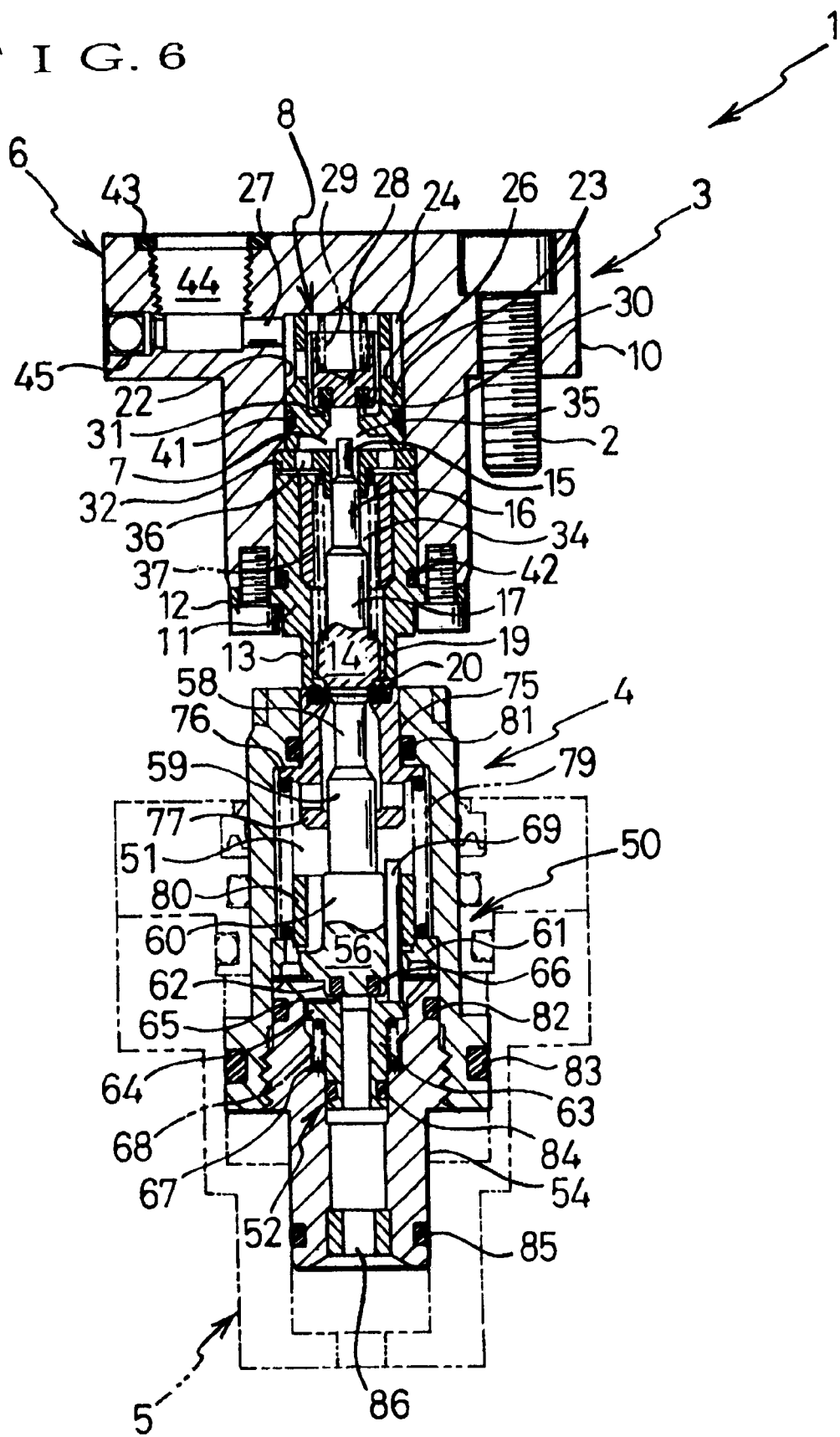
FIG. 6 is a vertical cross sectional view of the two couplers in a condition transient to a coupled position.
Figure 7:
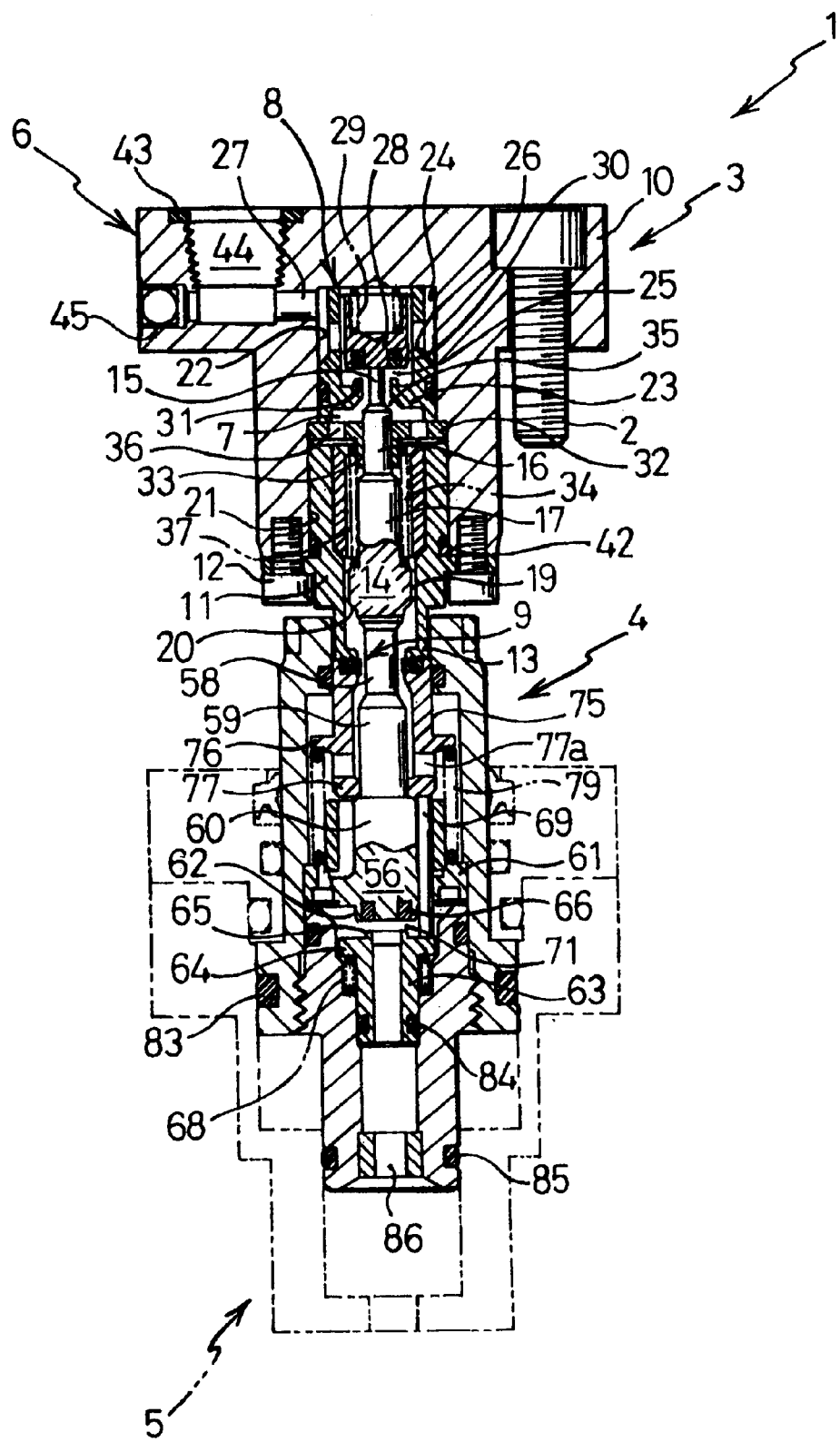
FIG. 7 is a vertical cross sectional view of the two coupled couplers.
Figure 8:
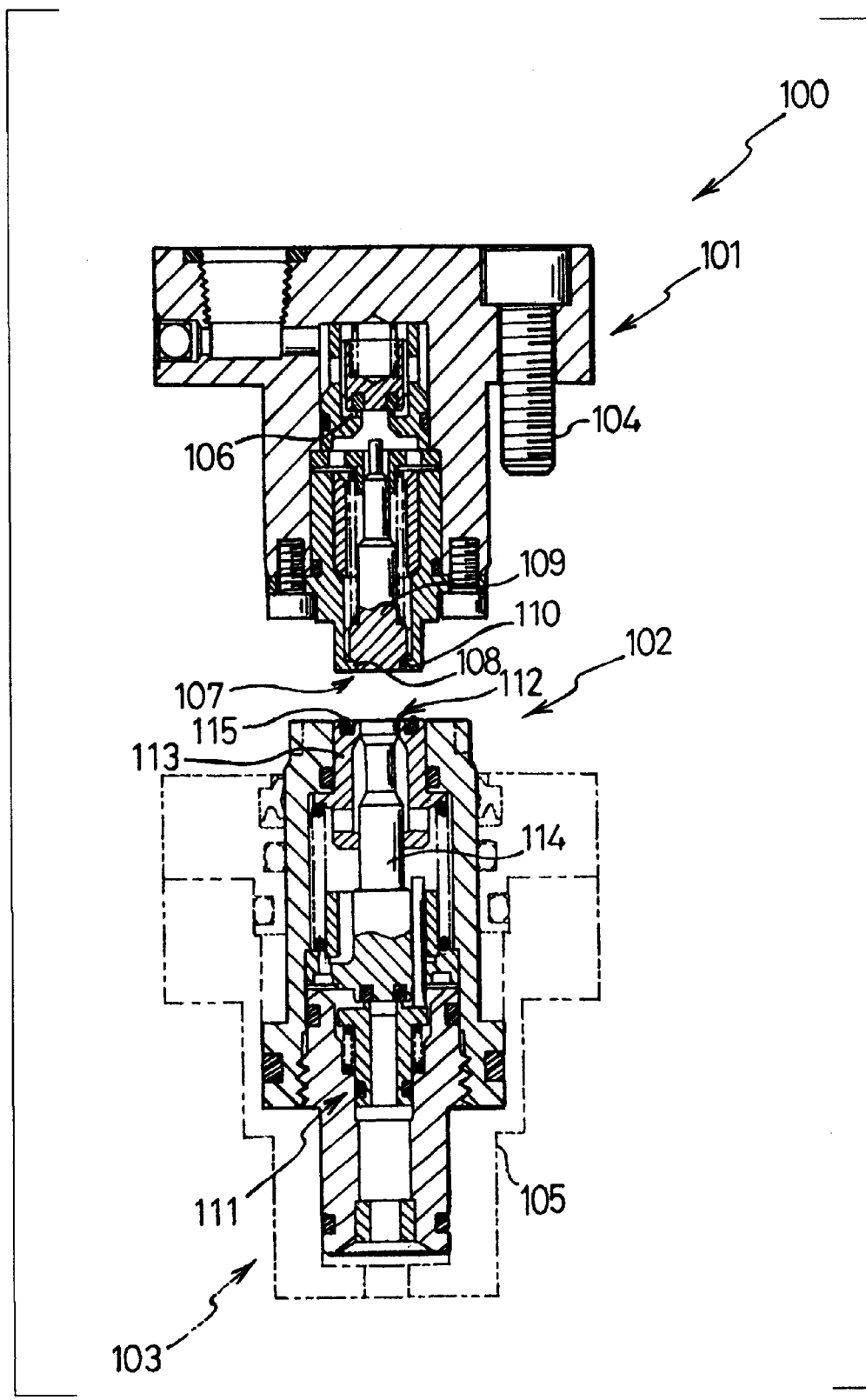
FIG. 8 is a vertical cross sectional view of a conventional separated coupling device.
Figure 9:
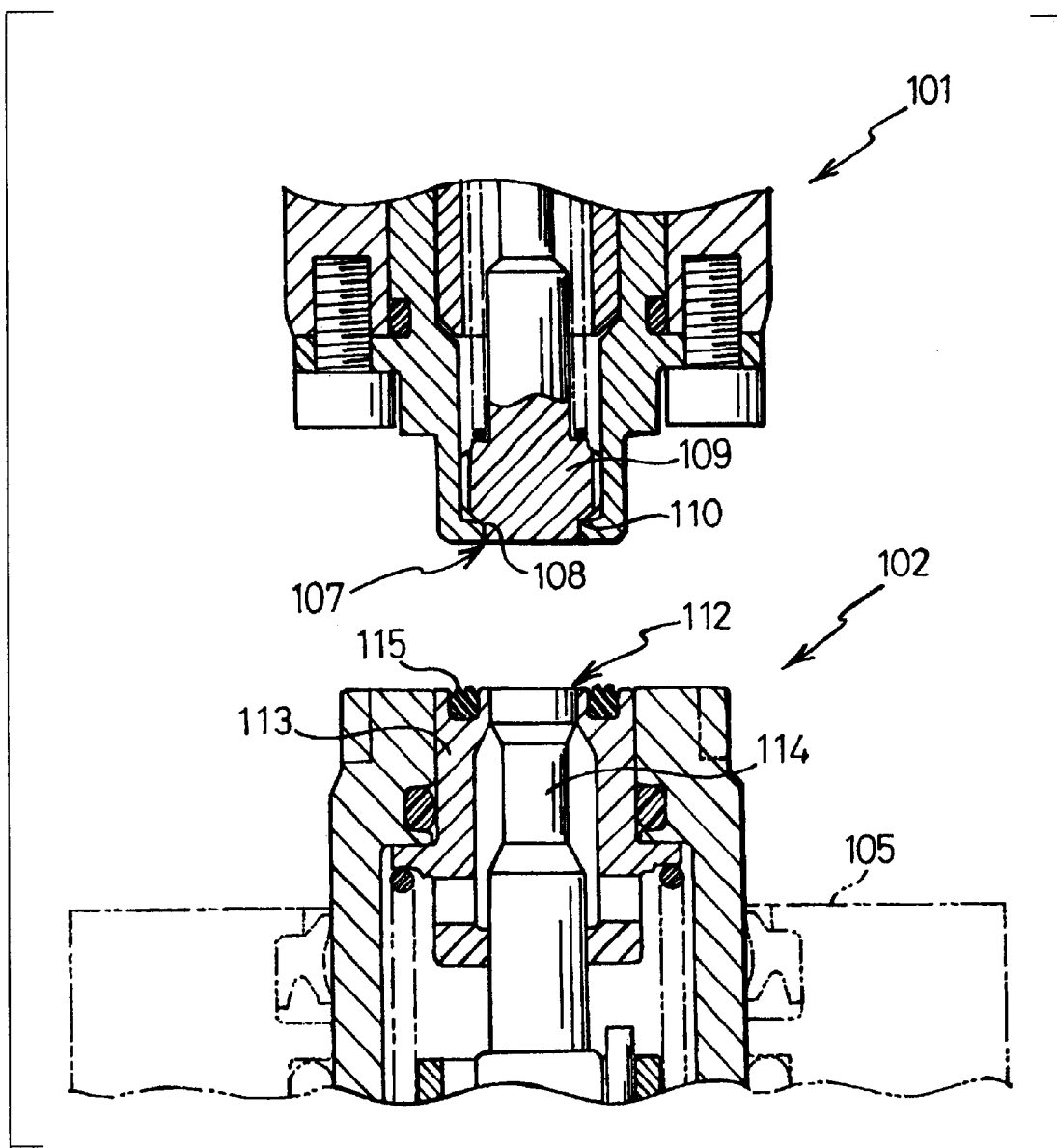
FIG. 9 is an enlarged cross sectional view of a primary part of the conventional coupling device shown in FIG. 8.
Figure 10:
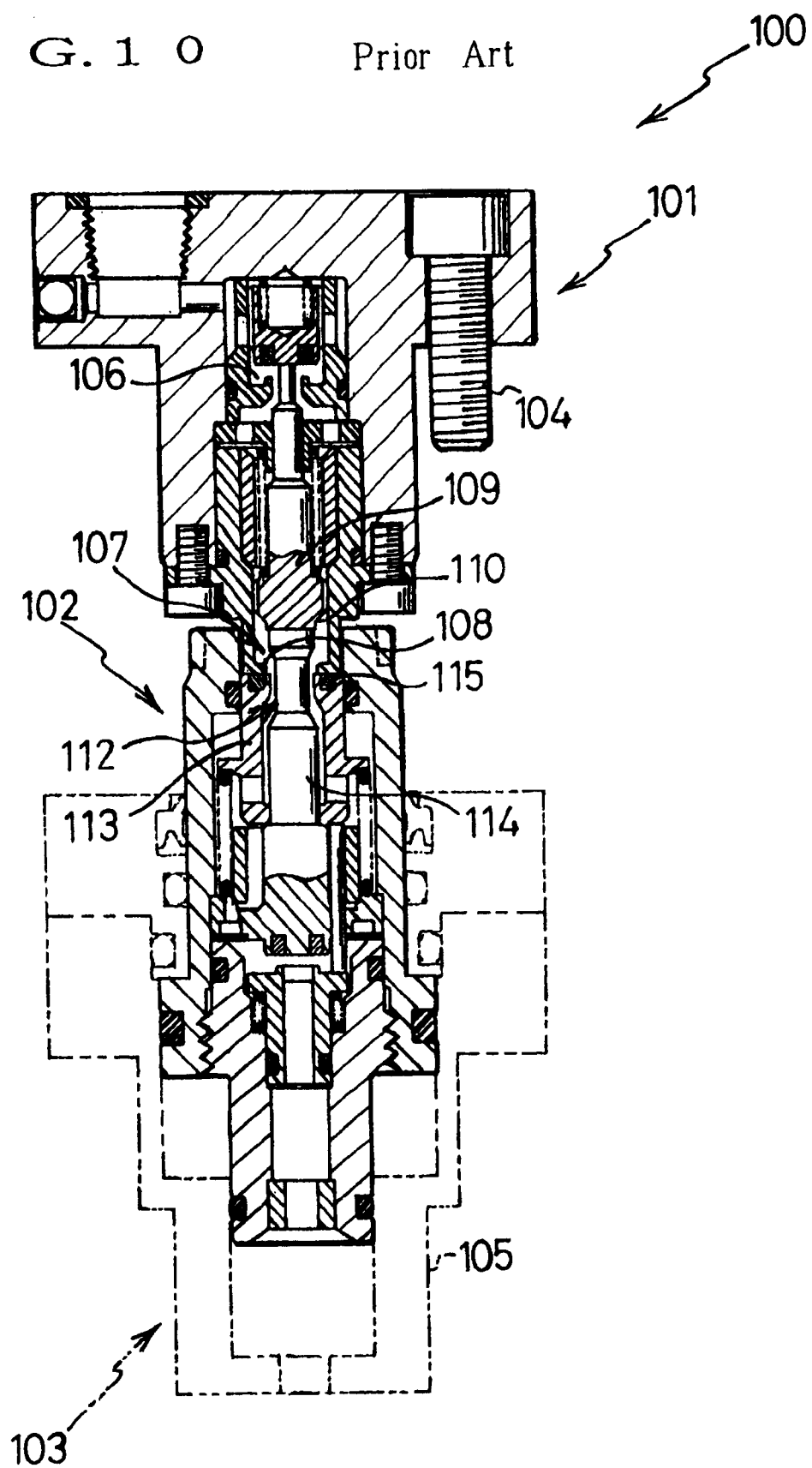
FIG. 10 is a vertical cross sectional view of the conventional coupling device shown in FIG. 8 in a coupled condition.

Referring to FIGS. 1, 6, and 7, main opening/closing valve 8 has a valve seat member 23, a valve member 28, a compression spring 29, an protruded valve seat member 31, an annular seal element 30, a small diameter portion 15 of valve shaft 14, a passage 25, and apertures 26. Main case 6 has a bore 22 in an upper region thereof extending continuously from engaging bore 21 in cylindrical case 11, and having an inner diameter slightly smaller than that of engaging bore 21. Valve seat member 23, preferably having a cylindrical shape, is movably inserted in bore 22. Main opening/closing valve 8 includes a passage 24 between valve seat member 23 and the wall of bore 22 and apertures 26 communicated with passages 25 and 27.

Valve member 28 is movably installed in valve seat member 23 and biased by compression spring 29 toward closing position (See FIG. 1). Annular seal element 30, preferably made of a synthetic resin material (for example, nylon), is mounted to the lower end of valve member 28. Valve seat member 23 has an annular protruded valve seat portion 31 arranged opposite to annular seal element 30. When annular seal element 30 is pressed against protruded valve seat portion 31, passage 25 is closed.

Referring to FIG. 7, when the male and female couplers 3 and 4 are coupled with each other, valve member 28 is moved upwardly by small diameter portion 15 of valve shaft 14 as resisting against compression spring 29. The upward movement of valve member 28 along the axial direction causes main opening/closing valve 8 to open. When the male and female couplers 3 and 4 are separated from each other, annular seal element 30 contacts protruded valve seat portion 31, thus closing main opening/closing valve 8.

Next, auxiliary opening/closing valve 9 in male coupler 3 is explained.

Referring to FIGS. 1, 5, 6 and 7, a spring receiver 32 is mounted at the upper end of engaging bore 21 between valve seat member 23 and cylindrical case 11. Spring receiver 32 has a cylindrical guide portion 33 for guiding medium diameter portion 16 of valve shaft 14. Plural apertures 36 communicate a passage 34 (provided in cylindrical case 11) and a passage 35. An upper end of a compression spring 37, urging valve shaft 14 downward, is mounted on guide cylindrical portion 33.

Auxiliary opening/closing valve 9 is a first valve mechanism. Protruded cylindrical portion 13 of auxiliary opening/closing valve 9 is provided with a valve seat portion 39 in the form of an annular tapered face. Valve body portion 20, formed at the lower end of valve shaft 14, moves to engage and disengage directly on valve seat portion 39. Valve body portion 20 is urged downward by compression spring 37. When the portion disengages, a passage or passage region is formed between protruded cylindrical portion 13 and valve shaft 14. When auxiliary opening/closing valve 9 is closed, valve body portion 20 stays in direct contact, at metal touch, with valve seat portion 39, thus closing the passage in auxiliary opening/closing valve 9.

A spacer 40 is mounted in cylindrical case 11 for controlling the residual pressure of the hydraulic oil or the negative pressure by means of selectively adjusting the volume in the passage between main opening/closing valve 8 and auxiliary opening/closing valve 9 in male coupler 2. Numerals 41 to 43 denote seal elements, numeral 44 denotes a port for connecting with a hydraulic tube connector, and numeral 45 denotes a plug.

Female coupler 4 is now explained.

Figure 4:
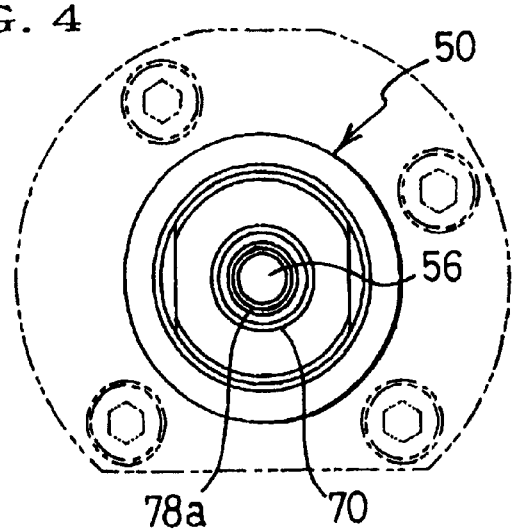
FIG. 4 is a cross sectional end view taken along the line IV—IV of FIG. 1.

Referring to FIGS. 1 and 4, female coupler 4 includes a main case 50. A hydraulic passage 51 is in main case 50. A main opening/closing valve 52 opens and closes passage 51. An auxiliary opening/closing valve 53, described later, is also part of female coupler 4. Main case 50 is positioned vertically. A lower case of main case 50 is threaded into the lower end of main case 50, constituting a portion of main case 50.

Referring now to FIGS. 1, 5, 6 and 7, main case 50 has an engaging bore 55 provided in an upper end thereof for accepting protruded cylindrical portion 13 of male coupler 3. A shaft member 56 is securely mounted in main case 50, extending from the upper end to an intermediate step. Shaft member 56 includes, from the upper end toward the lower end, a cylindrical valve face portion 57, a small-diameter portion 58, a medium diameter portion 59 substantially identical in diameter to cylindrical valve face portion 57, a large-diameter portion 60, a flange portion 61, and a valve seat portion 62 substantially identical in diameter to large diameter portion 60.

Main opening/closing valve 52 in female coupler 4 is now explained below.

Referring to FIGS. 1, 6, and 7, main opening/closing valve 52 includes a cylindrical valve body 63. An annular projection 65 is provided on cylindrical valve body 63. An annular seal element 66 is preferably made of a synthetic resin material. A compression spring 68 and a plurality of pins 69 are also included in main opening/closing valve 52. Lower case 54 has, at the inside, a large diameter portion, a medium diameter portion, and a small diameter portion, arranged from the upper end to an intermediate step. Cylindrical valve body 63 is installed in the small diameter portion of lower case 54 for axial movements. Cylindrical valve body 63 has, at the upper end, a flange portion 64. Annular projection 65, on the upper end of flange portion 64, comes into direct contact with annular seal element 66 mounted on the lower end of valve seat portion 62.

Compression spring 68 is mounted between flange portion 64 and a step portion 67 for urging cylindrical valve body 63 upwardly. When the male and female couplers 3 and 4 are separated from each other, annular projection 65 is urged by compression spring 68 coming into direct contact with annular seal element 66, thus closing main opening/closing valve 52 (See FIG. 1). Flange portion 61 has six bores provided therein, preferably at equal intervals along the circumference. Three pins 69 are inserted into alternately into three of the six bores. Three pins 69 are supported at the lower end directly by flange portion 64. The remaining three bores serve as the passages of the hydraulic oil.

Referring to FIGS. 1 and 7, the upper ends of three pins 69 extend upward through large diameter portion 60. When the male and female couplers 3 and 4 are coupled to each other, three pins 69 are pressed down by a cylindrical member 70 fitted on shaft member 56 to move cylindrical valve body 63 downward as resisting against compression spring 68. This coupling procedure opens hydraulic passage 71, causing main opening/closing valve 52 to open (See FIG. 7).

Auxiliary opening/closing valve 53 in female coupler 4 is now explained.

Auxiliary opening/closing valve 53 is a second valve mechanism. As shown in FIG. 5, auxiliary opening/closing valve 53 includes a shaft member 56, having a cylindrical valve face portion 57. A cylindrical member 70 has a valve body portion 73 to open and close hydraulic passage 74 between cylindrical member 70 and shaft member 56.

Cylindrical member 70 is positioned beneath and opposite to the distal end of protruded cylindrical portion 13 of male coupler 3. Cylindrical member 70 is slidably fitted in engaging bore 55. Cylindrical member 70 includes, from the upper end towards the lower end, a cylindrical portion 75 substantially identical in the length to the engaging bore 55, a flange portion 76, and a cylindrical member lower portion 77. As shown in FIG. 5, annular seal element 78, preferably made of an elastic rubber material, fits in and is secured by adhesion or baking to a recess provided in the distal end of cylindrical portion.75.

Annular seal element 78 includes an annular seal portion 78a, extending outwardly from the upper end of cylindrical member 70, and an annular seal portion 78b, extending toward axis center side then cylindrical valve face portion 57. The two portions are integrally formed as a unit. Annular seal portion 78a seals off between protruded cylindrical portion 13 and cylindrical member 70 when the male and female couplers 3 and 4 are coupled to each other. Annular seal portion 78b, serving as valve body portion 73 of cylindrical member 70, comes into direct contact with cylindrical valve face portion 57 of shaft member 56 when the male and female couplers 3 and 4 are separated and shuts down the passage in auxiliary opening/closing valve 53.

A compression spring 79 is mounted for urging cylindrical member 70 toward the closing position (in the upward direction). A plurality of passages 77a are provided in cylindrical member lower portion 77. When the male and female couplers 3 and 4 are coupled to each other, cylindrical member lower portion 77 presses down the upper end of pins 69, thus opening main opening/closing valve 52.

A spacer 80 is provided between large diameter portion 60 of shaft member 56 and compression spring 79 for controlling the residual pressure of the hydraulic oil or the negative pressure by means of selectively adjusting the volume of the passage between main opening/closing valve 52 and auxiliary opening/closing valve 53 in female coupler 4. Numerals 81 to 85 denote seals and numeral 86 denotes a hydraulic oil discharge port.

The operation and function of coupling device 1 will now be described.

Referring back to FIGS. 1 and 5, when the male and female couplers 3 and 4 are separated, main opening/closing valve 8 in male coupler 3 remains in its closed state with valve body portion 20 of valve shaft 14 pressed by compression spring 37 against valve seat region 39 of protruded cylindrical portion 13, therefore keeping auxiliary opening/closing valve 9 closed.

At the time, main opening/closing valve 52 in female coupler 4 remains in its closed state and auxiliary opening/closing valve 53 stays in its closed state. More particularly, as valve body portion 73 of cylindrical member 70 is urged toward cylindrical valve face portion 57 of shaft member 56 by compression spring 79, valve body portion 73, which is a part of annular seal element 78, remains elastically deformed. Accordingly, the fluid passage between cylindrical member 70 and shaft member 56 is shut down, hence preventing any oil or air from being leaked out from auxiliary opening/closing valve 53, even if a pressure of the hydraulic oil remains in female coupler 4 or the pressure in female coupler 4 drops down close to the ambient pressure level.

Referring now to FIGS. 6 and 7, when male coupler 3 and female coupler 4 are being coupled to each other, i.e. female coupler 4 is advanced towards male coupler 3 by hydraulic cylinder 5, protruded cylindrical portion 13 and cylindrical member 70 come into direct contact with each other and, simultaneously, valve shaft 14 and shalt member 56 come into direct contact with each other. Then, with valve shaft 14 and shaft member 56 remaining in direct contact with each other, protruded cylindrical portion 13 of male coupler 3 moves into engaging bore 55 in main case 50 of female coupler 4. As valve shaft 14 of male coupler 3 retracts in the upward direction relative to cylindrical case 11, the two main opening/closing valves 8 and 52 are opened and, simultaneously, the two auxiliary opening/closing valves 9 and 53 are opened, thereby communicating the passages in the male and female couplers 3 and 4.

In this coupled position, the gap between protruded cylindrical portion 13 and cylindrical member 70 is shut down assuredly by annular seal portion 78a of cylindrical member 70, thereby preventing oil in the passages from leaking out from the gap between protruded cylindrical portion 13 and cylindrical member 70.

For switching to the separated position to separate the male and female couplers 3 and 4 from each other, female coupler 4 is lifted down by hydraulic cylinder 5. In the separated position, if main opening/closing valve 52 in female coupler 4 permits an amount of the oil of a higher pressure to be leaked and conveyed up to the upper end of female coupler 4, annular seal element 78 elastically deforms to prevent any leakage from auxiliary opening/closing valve 53.

As set forth above, coupling device 1, according to an embodiment of the present invention, has annular seal portion 78b of annular seal element 78 adapted for increasing the sealing effect of auxiliary opening/closing valve 53 while the male and female couplers 3 and 4 are separated, thus preventing any leakage of oil and the loss of oil, rarely polluting the environment of coupling device 1, and ensuring the operational durability. Also, annular seal element 78 is preferably made of a highly elastic rubber material, thereby ensuring the shielding of oil or air in the device and permitting auxiliary opening/closing valve 53 to have a higher level of the sealing effect. Moreover, the two annular seal portions 78a and 78b are formed on the single annular seal element 78, thereby contributing to the simplification of the structure at the distal end of cylindrical portion 75 and decreasing the overall number of the components.

Coupling device 1 of one embodiment of the present invention may be of any applicable type for detachably connecting the passage of other fluids than the hydraulic oil. It is also possible to use hydraulic cylinder 5 for driving male coupler 3 rather than female coupler 4 in coupling device 1. Furthermore, it is also possible to replace hydraulic cylinder 5 with another appropriate means for moving one of the male and female couplers 3 and 4 relative to the other.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A coupling device having a male coupler and a female coupler, wherein said male coupler and said female coupler fit together to connect a passage of a fluid, wherein:

said male coupler comprises:
    a male main opening/closing valve, opening after said male coupler meets with said female coupler, and closing before said male coupler is separated from said female coupler;
    a first valve mechanism having a protruded cylindrical member;
    said first valve mechanism located proximal to a coupling location, where said male coupler couples with said female coupler, with respect to said male main opening/closing valve;
    a valve shaft axially movable in an interior of said protruded cylindrical member;
    a first valve body portion on said valve shaft;
    said valve body portion engaging and disengaging from said interior with a valve seat portion provided in said protruded cylindrical member, thereby shutting down said passage of said fluid between said protruded cylindrical member and said valve shaft; and
    a fist spring, urging said first valve shaft toward a closed position;

said female coupler comprises:
    a female main opening/closing valve, opening after said male coupler meets with said female coupler, and closing before said male coupler is separated from said female coupler;
    a second valve mechanism having a main body case with an engaging bore provided therein;
    said second valve mechanism located proximal to a coupling location, where said male coupler couples with said female coupler, with respect to said female main opening/closing valve;
    said engaging bore fitting with said protruded cylindrical member;
    a shaft member mounted in said main body case;
    a cylindrical member, fitted on said shaft member, axially movable and positioned opposite to a distal end of said protruding cylindrical member,
    a second valve body portion provided on said cylindrical member, engaging and disengaging from an inner side with a cylindrical valve face portion;
    said cylindrical valve face portion provided near a distal end on said shaft member, thereby shutting down said passage of said fluid between said cylindrical member and said shaft member;
    a second spring, urging said cylindrical member toward a valve closed position; and
    an annular seal element having a first annular seal portion for sealing between said protruded cylindrical member and said cylindrical member, when said male coupler and said female coupler are engaged, and a second annular seal portion forming said second valve body portion on said cylindrical member; and
    said first annular seal portion and said second annular seal portion being integrally formed on a distal end of said cylindrical member.

2. The coupling device according to claim 1, wherein said annular seal element is made of an elastic rubber material.

3. The coupling device according to claim 1, wherein said first valve seat portion is an annular tapered face, thereby allowing said first valve body portion to directly contact said first valve seat portion.

4. The coupling device according to claim 1, further comprising:
- a third spring, urging said male main opening/closing valve in a closed position; and
- a fourth spring, urging said female main opening/closing valve in a closed position.

5. A coupling device for coupling a male coupler and a female coupler, comprising:
- a male coupler main valve;
- a male coupler auxiliary valve;
- a female coupler main valve;
- a female coupler auxiliary valve;
- said male coupler auxiliary valve located proximal to a coupling location, where said male coupler couples with said female coupler, with respect to said male coupler main valve;
- said female coupler auxiliary valve located proximal to a coupling location where said male coupler couples with said female coupler, with respect to said female coupler main valve;
- said male coupler main valve opening after said male coupler meets with said female coupler; and closing before said male coupler is separated from said female coupler;
- said female coupler main valve opening after said male coupler meets with said female coupler, and closing before said male coupler is separated from said female coupler;
- at least first and second male coupler springs, urging said male coupler main valve and said male coupler auxiliary valve, respectively, in a closed position;
- at least first and second female coupler springs, urging said female coupler main valve and said female coupler auxiliary valve, respectively, in a closed position;
- said male coupler auxiliary valve being positioned in at least a portion of a protruded cylindrical member;
- said female coupler auxiliary valve being positioned in at least a portion of a cylindrical member; and
- said protruded cylindrical member fitting into said cylindrical member when said male coupler and said female coupler are mated.

6. A coupling device according to claim 5, further comprising:
- a male coupler valve stem on a distal end, relative to said protruded cylindrical member, of said male coupler auxiliary valve; and
- said male coupler valve stem opening said male coupler main valve when said male coupler auxiliary valve is opened by the action of inserting said protruded cylindrical member into said cylindrical member.

7. A coupling device according to claim 5, further comprising:
- an annular seal element on a distal end, relative to a coupling location of said male coupler and said female coupler, of said cylindrical member of said female coupler;
- said annular seal element having a first and a second annular seal portion;
- said first annular seal element seals between said protruded cylindrical member of said male coupler and said cylindrical member of said female coupler when said male coupler and said female coupler are coupled;
- said second annular seal element forms a valve body portion of said cylindrical member; and
- said first annular seal element and said second annular seal element being integrally formed.

* * * * *